（12）United States Patent
Chan et al.

(10) Patent No.: US 12,021,885 B2
(45) Date of Patent: Jun. 25, 2024

(54) AGGREGATING RESULTS FROM MULTIPLE ANOMALY DETECTION ENGINES

(71) Applicant: International Business Machines Corporation, Armonk, NY (US)

(72) Inventors: Yuk L. Chan, Rochester, NY (US); Anuja Deedwaniya, Poughkeepsie, NY (US); Robert M. Abrams, Wappinger Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 17/120,335

(22) Filed: Dec. 14, 2020

(65) Prior Publication Data
US 2022/0191226 A1    Jun. 16, 2022

(51) Int. Cl.
*H04L 29/06* (2006.01)
*G06F 16/901* (2019.01)
*H04L 9/40* (2022.01)

(52) U.S. Cl.
CPC ...... *H04L 63/1425* (2013.01); *G06F 16/9024* (2019.01)

(58) Field of Classification Search
CPC ................... H04L 63/1425; G06F 16/9024
See application file for complete search history.

(56) References Cited

U.S. PATENT DOCUMENTS

| | | | |
|---|---|---|---|
| 9,787,705 B1 * | 10/2017 | Love | G06F 16/9024 |
| 10,454,753 B2 | 10/2019 | Sasturkar et al. | |
| 10,594,718 B1 | 3/2020 | Deaguero et al. | |
| 11,153,339 B1 * | 10/2021 | Kapoor | G06F 16/9537 |
| 11,190,534 B1 * | 11/2021 | Shah | H04L 63/1425 |
| 11,573,954 B1 * | 2/2023 | Cornell, Jr. | G06F 16/24 |
| 2007/0294187 A1 | 12/2007 | Scherrer | |
| 2009/0322758 A1 * | 12/2009 | Hillis | G06T 11/206 |
| | | | 345/440 |
| 2012/0041575 A1 | 2/2012 | Maeda et al. | |
| 2014/0006325 A1 | 1/2014 | Biem | |

(Continued)

OTHER PUBLICATIONS

Chan et al.; "Assigning an Anomaly Level to a Non-Instrumented Object"; U.S. Appl. No. 17/120,338, filed Dec. 14, 2020.

(Continued)

*Primary Examiner* — Joseph P Hirl
*Assistant Examiner* — Thomas A Gyorfi
(74) *Attorney, Agent, or Firm* — CANTOR COLBURN LLP; Teddi Maranzano (57) ABSTRACT

Examples described herein provide a computer-implemented method that includes receiving a list of objects with anomaly detection results associated therewith. The method further includes generating a resource graph, wherein the resource graph comprises at least two nodes, each of the at least two nodes being associated with one of the objects. The method further includes determining a relationship between the at least two nodes. The method further includes assigning an anomaly score to at least one of the objects. The method further includes calculating for at least one of the nodes, an overall anomaly score for the at least one of the nodes based on the anomaly score for the at least one of the objects and based on the anomaly score for another node related to the at least one of the nodes.

11 Claims, 10 Drawing Sheets

(56) References Cited

U.S. PATENT DOCUMENTS

| | | |
|---|---|---|
| 2014/0165201 A1 | 6/2014 | Wittenschlaeger |
| 2015/0033086 A1* | 1/2015 | Sasturkar ............... G06F 11/079 714/57 |
| 2016/0065604 A1 | 3/2016 | Chen et al. |
| 2016/0217022 A1 | 7/2016 | Velipasaoglu et al. |
| 2016/0219066 A1 | 7/2016 | Vasseur et al. |
| 2017/0005954 A1 | 1/2017 | Shaltiel et al. |
| 2017/0063910 A1* | 3/2017 | Muddu ................ H04L 43/062 |
| 2017/0124502 A1 | 5/2017 | Brew et al. |
| 2017/0142140 A1 | 5/2017 | Muddu et al. |
| 2018/0307994 A1 | 10/2018 | Cheng et al. |
| 2018/0336353 A1 | 11/2018 | Manadhata et al. |
| 2019/0124104 A1 | 4/2019 | Apostolopoulos |
| 2019/0182119 A1* | 6/2019 | Ratkovic ................ H04L 43/06 |
| 2019/0372827 A1 | 12/2019 | Vasseur et al. |
| 2020/0216097 A1 | 7/2020 | Galula et al. |
| 2020/0252310 A1 | 8/2020 | Thampy et al. |
| 2020/0285997 A1 | 9/2020 | Bhattacharyya |
| 2020/0287927 A1 | 9/2020 | Zadeh et al. |
| 2020/0351283 A1 | 11/2020 | Salunke et al. |
| 2021/0065245 A1* | 3/2021 | Resheff ............... G06F 16/9035 |
| 2021/0203576 A1 | 7/2021 | Padfield et al. |
| 2022/0188290 A1 | 6/2022 | Chan et al. |
| 2022/0188424 A1 | 6/2022 | Chan et al. |
| 2022/0303168 A1 | 9/2022 | Mdini et al. |

OTHER PUBLICATIONS

Chan et al.; "Anomaly Detection With Impact Assessment"; U.S. Appl. No. 17/120,333, filed Dec. 14, 2020.

List of IBM Patents or Patent Applications Treated as Related; Appendix P Filed Jan. 6, 2021; 2 Pages.

* cited by examiner

AGGREGATING RESULTS FROM MULTIPLE ANOMALY DETECTION ENGINES

BACKGROUND

Embodiments described herein generally relate to processing systems, and more specifically, to aggregating results from multiple anomaly detection engines.

Anomaly detection is the process of identifying data points from a data set that are considered outliers or otherwise fall outside some expected or desired range. As an example, in the case of information technology (IT) data, IT data can be collected from connected processing systems and/or components of the processing systems. The IT data can then be analyzed using anomaly detection techniques to determine whether an anomaly has occurred within the processing systems and/or the components of the processing systems. Discovery of anomalies is useful for diagnostic or proactive alerting. Diagnostics includes identifying the root cause or next step related to problems to enable the problems to be addressed proactively. Proactive alerting includes generating an alert or event based on a detected anomaly for a potential problem.

SUMMARY

Embodiments of the present invention are directed to presenting results from multiple anomaly detection engines.

A non-limiting example computer-implemented method includes receiving, by a processing device, a list of objects with anomaly detection results associated therewith. The method further includes generating, by the processing device, a resource graph, wherein the resource graph comprises at least two nodes, each of the at least two nodes being associated with one of the objects. The method further includes determining, by the processing device, a relationship between the at least two nodes. The method further includes assigning, by the processing device, an anomaly score to at least one of the objects. The method further includes calculating, by the processing device, for at least one of the nodes, an overall anomaly score for the at least one of the nodes based on the anomaly score for the at least one of the objects and based on the anomaly score for another node related to the at least one of the nodes.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide for aggregating (or "combining") results from multiple anomaly detection engines. Anomaly detection is useful for identifying root cause of problems to enable the problems to be addressed proactively or proactively generate an alert for potential problems.

Figure 1A:
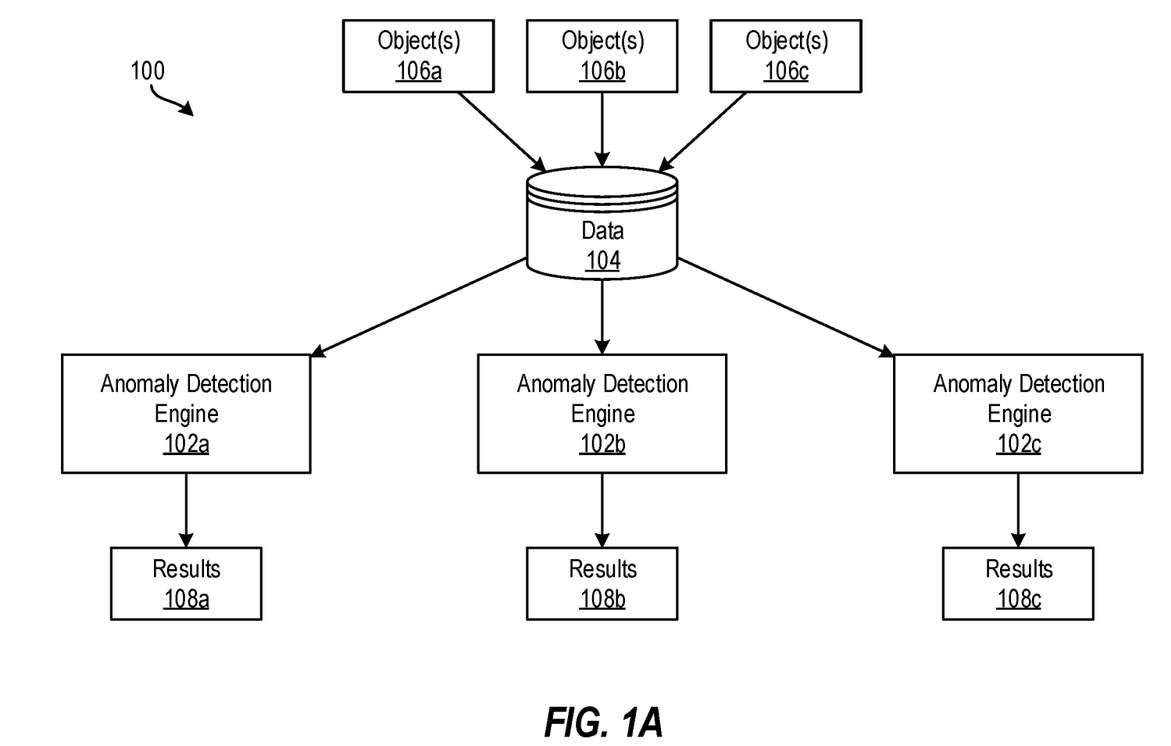
FIG. 1A depicts a block diagram of a system of anomaly detection engines.

There are many anomaly detection engines available for analyzing IT data. In some cases, two or more of these engines are applied to the same or related IT data, but the results of these engines are reported disjoint from each other. For example, FIG. 1A depicts an example of a system 100 of anomaly detection engines 102a, 102b, 102c (collectively referred to as "anomaly detection engines 102") that are disparate and that analyze data 104 that describe metrics and other identifying data about the system. The data 104 are collected from resource & work objects 106a, 106b, 106c (collectively referred to as "objects 106"). The objects can be networks, memory devices, processing devices, applications, etc. The anomaly detection engines 102 use different anomaly detection algorithms to generate results 108a, 108b, 108c (collectively referred to as "results 108"). Because different anomaly detection algorithms are applied to the data 104, the results 108a, 108b, 108c necessarily differ.

One or more embodiments of the present invention address one or more of the shortcomings of the prior art by providing a mechanism to aggregate results from multiple anomaly detection engines using a resource graph. The resource graph represents resources as nodes and represents relationships between the resources (nodes) as edges (or links) between the nodes. This aggregation can be done at the nodes of the graph and can be of different types. As an example, the aggregation can be from multiple anomaly results for the same node (e.g., from a different algorithm applied to the same data collection, from different sources of data from that collection that were analyzed, etc.) As another example, the combination can be from multiple anomaly results from one or more related resource and work nodes and combined based on node relationship. In this case, each type of relationship contains a description of how the nodes are combined/summarized. Through the relationships, a user can drill down based on the relationship of the nodes. For example, a summary can display for similar subsystem nodes. When a user drills down, multiple transaction nodes, direct access storage device nodes, control unit nodes, etc. can be displayed.

An example use case is as follows. With the availability of system management facilities-based anomaly detection, message-based and operating system-level storage and contention anomaly detection, the anomaly results can be assessed using a resource graph and summarized for interpretation. The anomalies are associated with the nodes (resources) depicted on the graph.

Figure 1B:
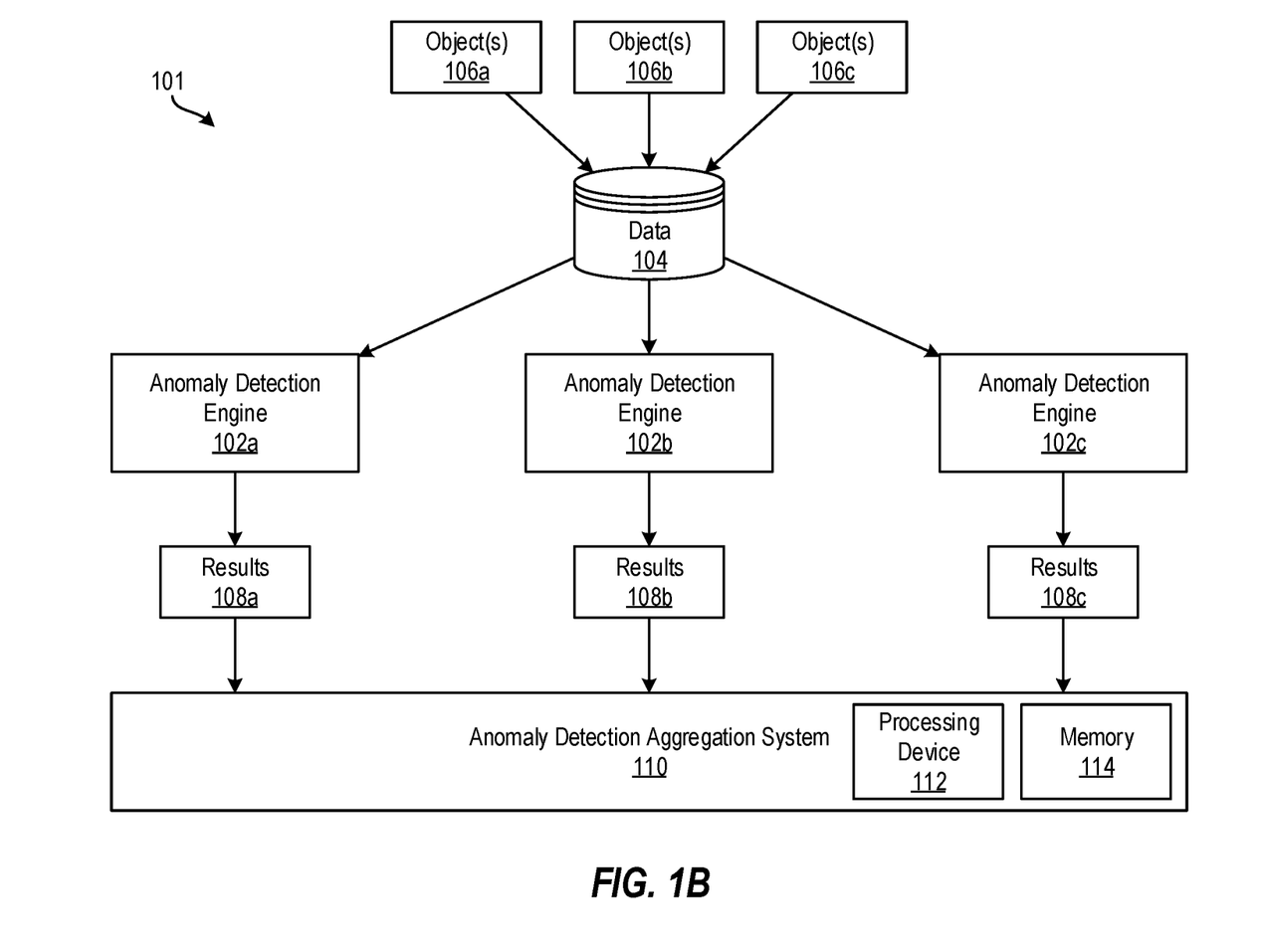
FIG. 1B depicts a block diagram of a system for aggregating results from multiple anomaly detection engines according to one or more embodiments described herein.

Turning now to FIG. 1B, an example of a system 101 including an anomaly detection aggregation system 110 for aggregating results from multiple anomaly detection engines is depicted according to one or more embodiments of the present invention. The features and functionality of the anomaly detection aggregation system 110, described in more detail herein, can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the features and functionality of the anomaly detection aggregation system 110 can be a combination of hardware and programming. The programming can be processor executable instructions stored on a tangible memory, and the hardware can include a processing device 112 for executing those instructions. Thus a memory 114 can store program instructions that when executed by the processing device 112 implement the features and functionality described herein.

Given a resource relationship, a resource graph can be created. The resource graph depicts the resources (CPU, application, address space, job, memory, I/O, etc.) as nodes and a relationship between the nodes as edges or links. For each independent anomaly detection results 108 (e.g., job from job log, operating system from OPERLOG, SMF 110 records for DB2 subsystem, SMF 110 records for DB2 transactions), the anomaly detection aggregation system 110 adds anomaly information as attributes of the nodes. For example, for a Customer Information Control System (CICS) transaction processing system, a resource graph can be generated (see FIGS. 3 and 4 for examples of such resource graphs). The CICS subsystem itself can be a node in the resource graph, and there are other nodes that represent transaction IDs in the CICS. The subsystem node is linked to the transaction node because the transaction is running within the CICS subsystem (i.e., an inherent relationship). In some cases, a node for a CICS subsystem can have two types of anomaly information: subsystem level data and summarized data from the transaction nodes.

The subsystem level data may include three different sets of attributes as represented by system management facilities (SMF) 110 records, CICS log records for the CICS subsystem, and job log records for the CICS subsystem. The summarized data from the transaction nodes (or any related nodes) can be generated using a statistical summary technique from the multiple transaction nodes: for example, the worst anomaly amount of all transactions, 10% or more of the transactions having a high anomaly, etc.

The anomaly detection aggregation system 110, from the multiple attributes and summary from the related nodes, generates an anomaly score for the CICS subsystem node. In examples, a user is presented with an interface/tool to view the relationships between the nodes. Through these relationships, a user can assess the node anomaly by drilling down to view the different relationships of the node. For example, a summary can display for the subsystem nodes. When the user drills down, the multiple transaction nodes, DASD, control unit nodes, etc. can be displayed.

The features and functionality of the anomaly detection aggregation system 110 are now described in more detail with reference to FIGS. 2-6.

Figure 2A:
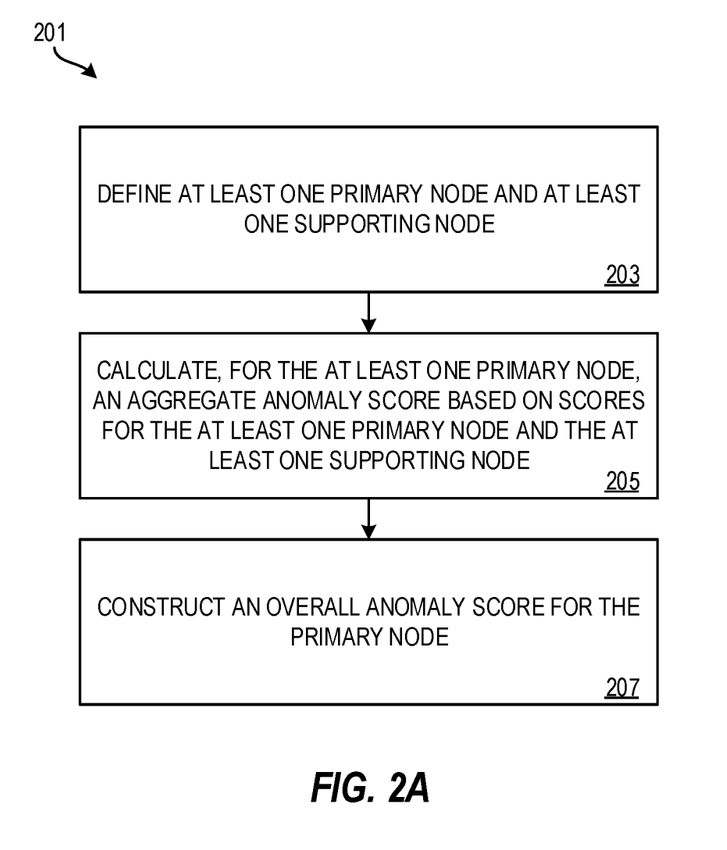
FIG. 2A depicts a flow diagram of a method for aggregating results from multiple anomaly detection engines according to examples of the present disclosure.

An example of a method 201 for aggregating results from multiple anomaly detection engines can be performed as follow, as shown in FIG. 2A. At block 203, the anomaly detection aggregation system 110 defines at least one primary node, like that associated with a server program or subsystem, and at least one supporting (or resource) node, like network and memory. At block 205, the anomaly detection aggregation system 110 calculates, for each primary node, an aggregate anomaly score based on the scores for the primary node and each supporting node. Using these values, the anomaly detection aggregation system 110, at block 207, constructs an overall summary score for the primary node. The overall summary score is calculated based on weighted values reflecting the level of service determined by the node relationships ("Use as," "Part of," etc.).

Figure 2B:
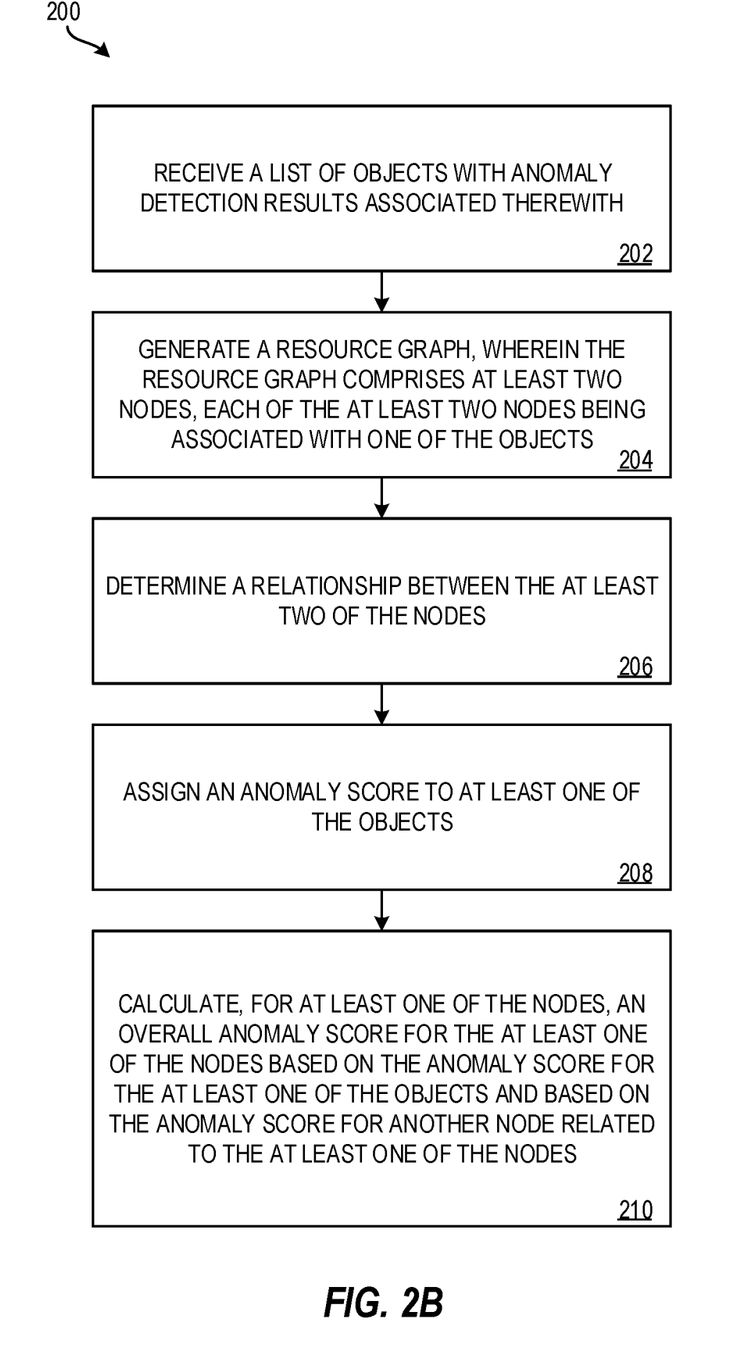
FIG. 2B depicts a flow diagram of a method for aggregating results from multiple anomaly detection engines according to examples of the present disclosure.

FIG. 2A depicts a flow diagram of a method for aggregating results from multiple anomaly detection engines according to examples of the present disclosure FIG. 2B depicts a flow diagram of a method 200 for aggregating results from multiple anomaly detection engines according to examples of the present disclosure. The method 200 can be implemented using any suitable system (e.g., the anomaly detection aggregation system 110, the processing system 900 of FIG. 9, etc.) and/or any suitable device (e.g., the processing device 112, one or more of the processors 921a, 921b, 921c of FIG. 9, etc.).

At block 202, the anomaly detection aggregation system 110 receives a list of objects with anomaly detection results associated therewith. For example, the anomaly detection aggregation system 110 receives the results 108a, 108b, 108c from the respective anomaly detection engines 102a, 102b, 102c. With the results, the anomaly detection aggregation system 110 also receives a list of objects (e.g., the objects 106a, 106b, 106c) that are associated with the results 108a, 108b, 108c. It should be appreciated that the results can be received from multiple anomaly detection engines and can differ in data types. For example, the data can be syslog data, system management facilities data, temperature of a central processor unit and/or other suitable types of data or metrics.

Figure 3:
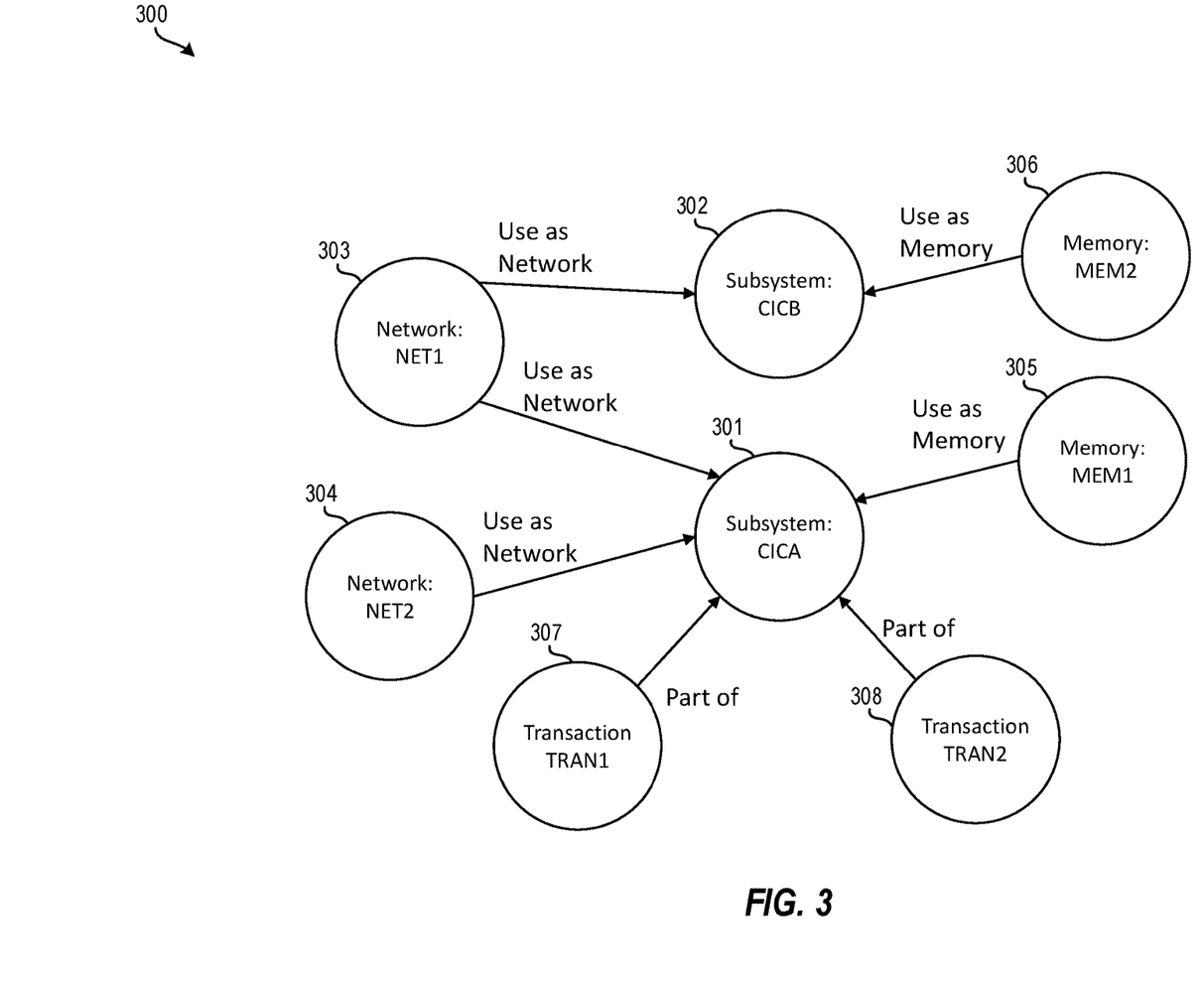
FIG. 3 depicts a resource graph according to one or more embodiments described herein.
Figure 4:
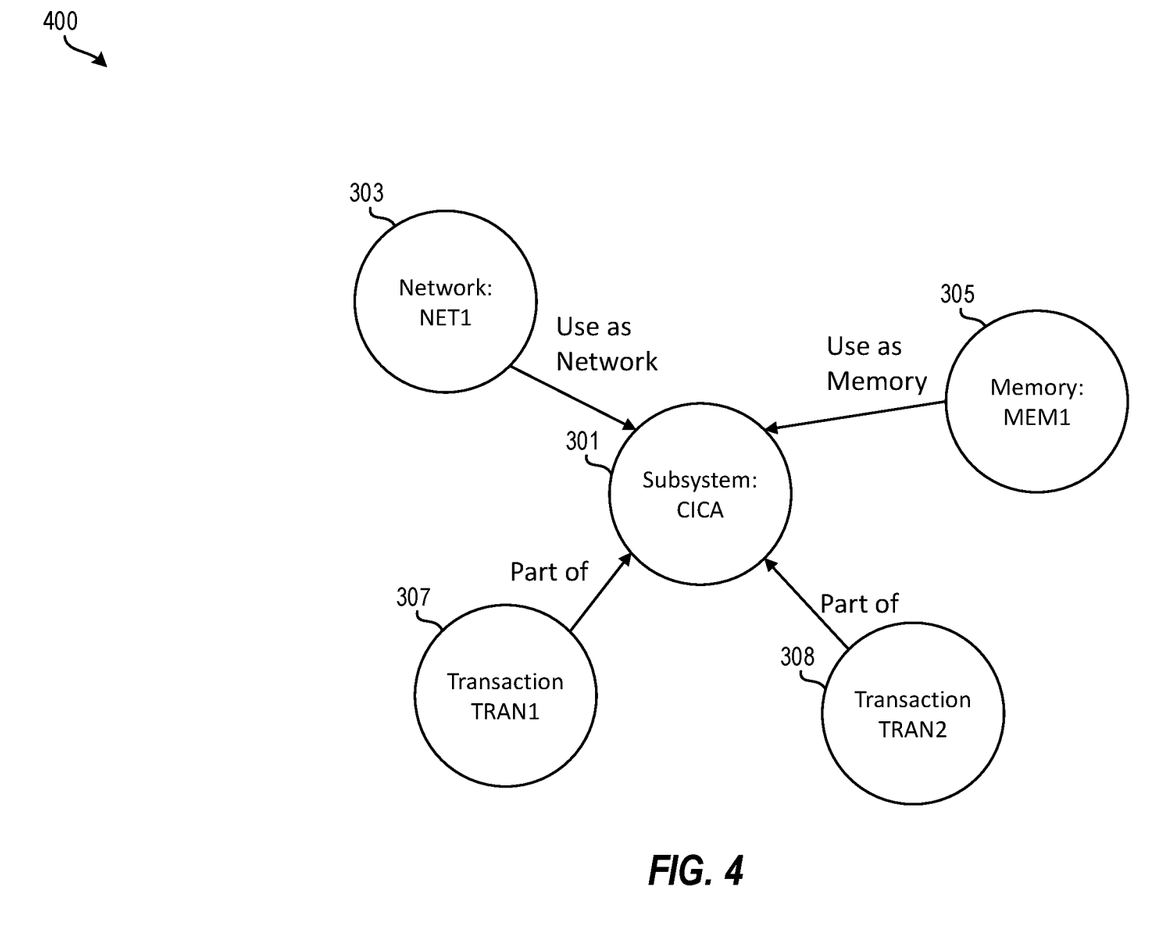
FIG. 4 depicts a resource graph according to one or more embodiments described herein.

At block 204, the anomaly detection aggregation system 110 generates a resource graph, and at block 206, the anomaly detection aggregation system 110 determines a relationship between the at least two of the nodes. The resource graph includes at least two nodes, and each of the at least two nodes are associated with one of the objects. FIGS. 3 and 4 each depict example resource graphs. Particularly, FIG. 3 depicts a resource graph 300 according to one or more embodiments described herein, and FIG. 4 depicts a resource graph 400 according to one or more embodiments described herein. It should be appreciated that the resource graphs 300 and 400 are merely examples and that other resource graphs are possible.

With reference to FIG. 3, the resource graph 300 includes the following objects: subsystem CICA 301, which is an instance of a transaction processing system such as CICS; subsystem CICB 302, which is also an instance of the CICS; a network NET1 303, a network NET2 304, a memory MEM1 305, a memory MEM2 306, an application transaction TRAN1 307, and an application transaction TRAN2 308. Each of these objects (301-308) are represented in the resource graph 300 as nodes. The nodes are connected by edges or links (shown as arrows) that represent the relationships between the objects/nodes. For example, the relationship between the subsystem CICA 301 and each of the networks NET1 303 and NET2 304 is "use as network." The subsystem CICB 302 has the same "use as network" relationship with the network NET1 303. Each of the subsystems CICA 301 and CICB 302 have a separate "use as memory" relationship with the memories MEM1 305 and MEM2 306 respectively. The transactions TRAN1 307 and TRAN2 308 have a "part of" relationship with the subsystem CICA 301.

With reference to FIG. 4, the resource graph 400 includes a subset of the objects of the resource graph 300, namely the following objects: the subsystem CICA 301, the network NET1 303, the memory MEM1 305, the application transaction TRAN1 307, and the application transaction 308. These objects have similar relationships as described regarding the resource graph 300.

Figure 5:
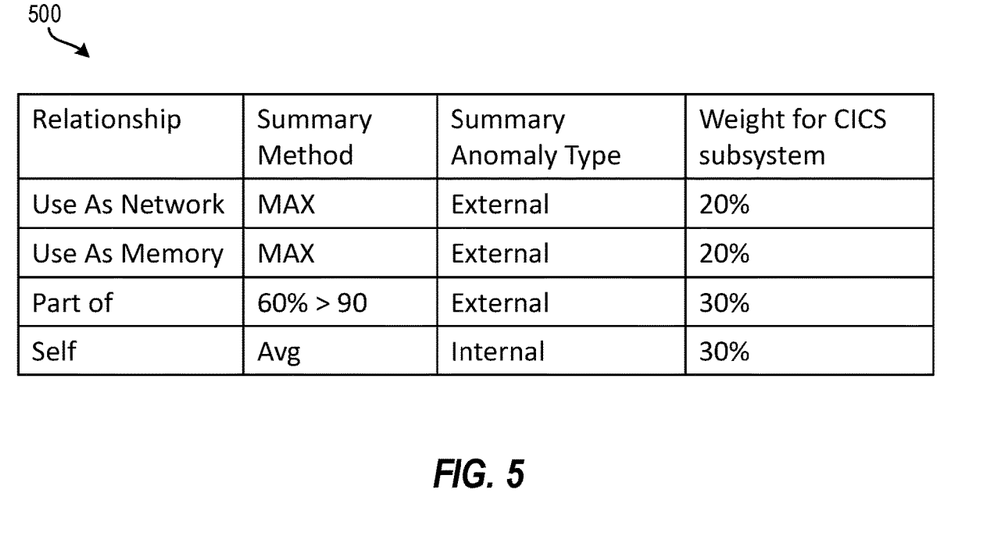
FIG. 5 depicts a table showing the attributes for the resource graph of FIG. 4 according to one or more embodiments described herein.

As described, it should be appreciated that each node can have a relationship with another node or nodes. These relationships can include the following attributes: relationship, summary method, and summary type. The relationship attribute is the relationship between the nodes, such as resources used by the subsystem node, or work that is part of the subsystem node, as shown in FIGS. 3 and 4. The summary method attribute is the method used to generate a summary across multiple nodes of the same relationship. The summary type attribute is the type of summary generated by the summary method attribute. This type, together with the relationship, can be further used to generate a summary for a subsystem of a transaction processing system (e.g., the subsystem CICA 301 of FIGS. 3 and 4, the subsystem CICB 302 of FIG. 3, etc.), With continued reference to FIG. 2B, the resource graph generated at block 204 and the relationships identified at block 206 could come from: a relationship between an application discovered using an automated discovery and mapping tool; discovery from static tools (e.g., a discovery library adapter); configuration management, and/or inherent relationships, (e.g., a CICS transaction running in a CICS region has an inherent relationship). FIG. 5 depicts a table 500 showing the attributes (e.g., relationship, summary method, and summary type) for the resource graph 400 of FIG. 4 according to one or more embodiments described herein. For the nodes related to the subsystem CICA 301 of FIG. 4, the table 500 is summarized as follows. The MAX anomaly of nodes with a "use as network" relationship is 80. The MAX anomaly of nodes with a "use as memory" relationship is 70. More than 60% of the nodes with a "part of" relationship has a score greater than 90. Therefore, the "part of" relationship contributed a score of 90 to the subsystem CICA 301. The MAX anomaly of the different logs within the Subsystem CICA 301 can be calculated as follows: average(80+95+90)≈88.3.

Figure 6:
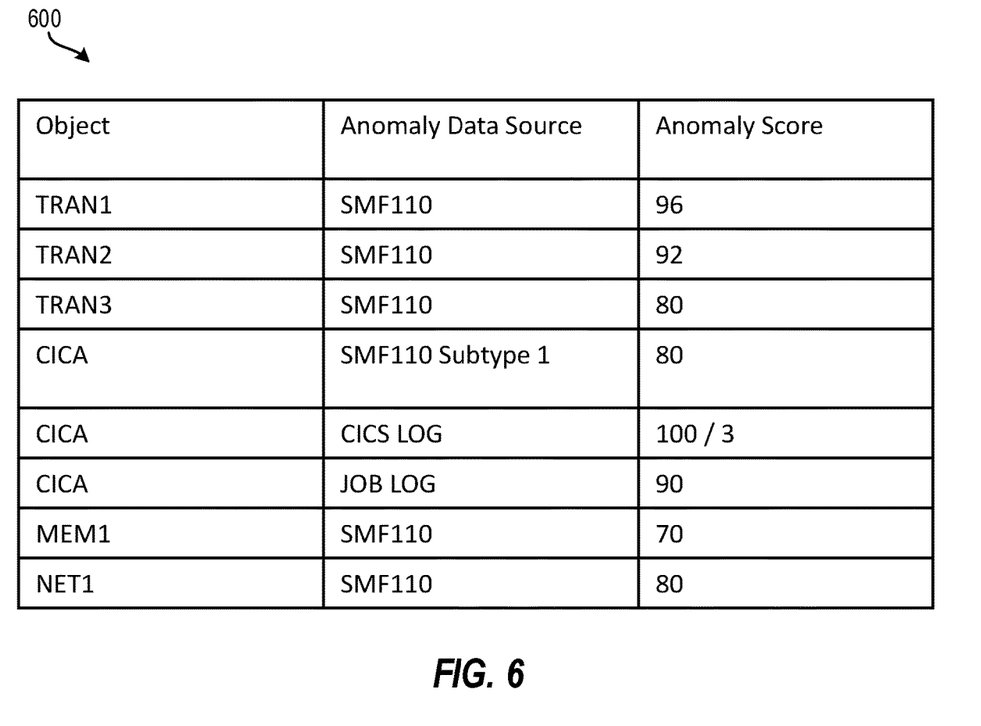
FIG. 6 depicts a table showing anomaly scores for the nodes of the resource graph of FIG. 4 according to one or more embodiments described herein.

At block 208, the anomaly detection aggregation system 110 assigns an anomaly score to at least one of the objects. As an example, FIG. 6 depicts a table 600 showing anomaly scores for the nodes of the resource graph 400 of FIG. 4. The table 600 shows, for each object (e.g., the objects of FIG. 4) an anomaly data source and an anomaly score. For example, for the object application transaction TRAN1 307, the anomaly data source is SMF 110 (which is system management facilities data) and the anomaly score is 96. Anomaly scores are assigned for each of the other objects as well, as shown in the table 600.

At block 210, the anomaly detection aggregation system 110 calculates, for at least one of the nodes, an overall anomaly score for the at least one of the nodes. The overall anomaly score is based on the anomaly score for the at least one of the nodes and is based on the anomaly score for other node(s) related to the at least one of the nodes.

For the example of FIG. 3, the overall anomaly score for the subsystem CICA 301 is calculated based on the anomaly scores for each of the network NET1 303, the network NET2 304, the memory MEM1 305, the transaction TRAN1 307, and the transaction TRAN2 308. Similarly, the overall anomaly score for the subsystem CICB 302 is calculated based on the anomaly scores for each of the NET1 303 and the memory MEM1 305.

For the example of FIG. 4, the overall anomaly score for the subsystem CICA 301 is calculated based on the anomaly scores for each of the network NET1 303, the memory MEM1 305, the transaction TRAN1 307, and the transaction TRAN2 308.

According to examples, the overall anomaly score is calculated using a weighted linear combination. In such cases, a weight can be assigned to each node as shown in FIG. 5. The weighted linear combination can be, for example, a statistical method that combines the anomaly score from each of the at least two nodes multiplied by a weight that represents a relationship to the respective nodes. As an example, the weighted linear combination is a sum of a weight assigned to each of the nodes multiplied by its respective/corresponding anomaly score. For example, the weight is multiplied by the anomaly score for each of the individual nodes as follows:

Overall Anomaly Score=weight_*NET*1*anomaly_score_*NET*1+ weight_*MEM*1*anomaly_score_*MEM*1+ weight_CICA*anomaly_score_CICA+ weight_transactions*anomaly_score_transactions Overall Anomaly Score=80*20%+70*20%+90*30%+ 90*30%=84

The weight assigned to each of the nodes can be set by a user, can be set dynamically, can be set based on historical data, etc. The overall anomaly score can be used to determine whether to take an action to correct an anomaly, for example. This enables proactive identification and correction of problems within a system.

Additional processes also may be included. For example, the anomaly detection aggregation system 110 can determine whether the overall anomaly score for the at least one of the nodes exceeds a threshold. The threshold can be predetermined, can be automatically set by the anomaly detection aggregation system 110, can be learned over time by the anomaly detection aggregation system 110 (e.g., using machine learning techniques), can be based on historical data, can be manually set/adjusted by a system administrator, and/or combinations thereof. Then, responsive to determining that the overall anomaly score for the at least one of the nodes exceeds the threshold, the anomaly detection aggregation system 110 can cause an action to be taken to remedy an anomaly associated with the overall anomaly score that exceeds the threshold.

It should be understood that the processes depicted in FIGS. 2A and 2B represent illustrations, and that other processes may be added or existing processes may be removed, modified, or rearranged without departing from the scope of the present disclosure.

Example embodiments of the disclosure include or yield various technical features, technical effects, and/or improvements to technology. Example embodiments of the disclosure provide an anomaly detection aggregation system configured to aggregate results from multiple anomaly detection engines by generating a resource graph of nodes, determining relationships between the nodes, assigning anomaly scores to objects represented by the nodes, and calculating an overall anomaly score for one of the nodes using the anomaly score for the node and anomaly scores for other nodes related to the node. These aspects of the disclosure constitute technical features that yield the technical effect of proactive identification and correction of problems within a system. For example, the overall anomaly score can be used to determine whether to take an action to correct an anomaly. As a result of these technical features and technical effects, an anomaly detection aggregation system in accordance with example embodiments of the disclosure represents an improvement to existing anomaly detection techniques. It should be appreciated that the above examples of technical features, technical effects, and improvements to technology of example embodiments of the disclosure are merely illustrative and not exhaustive.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
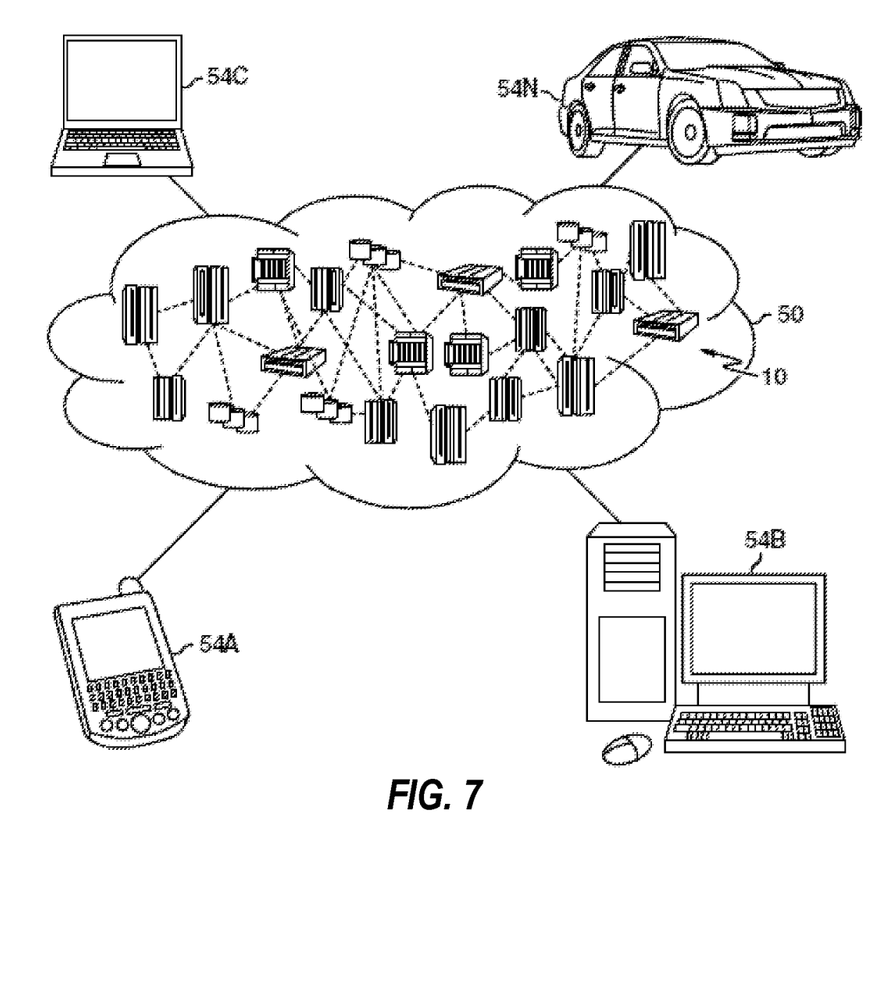
FIG. 7 depicts a cloud computing environment according to one or more embodiments described herein.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
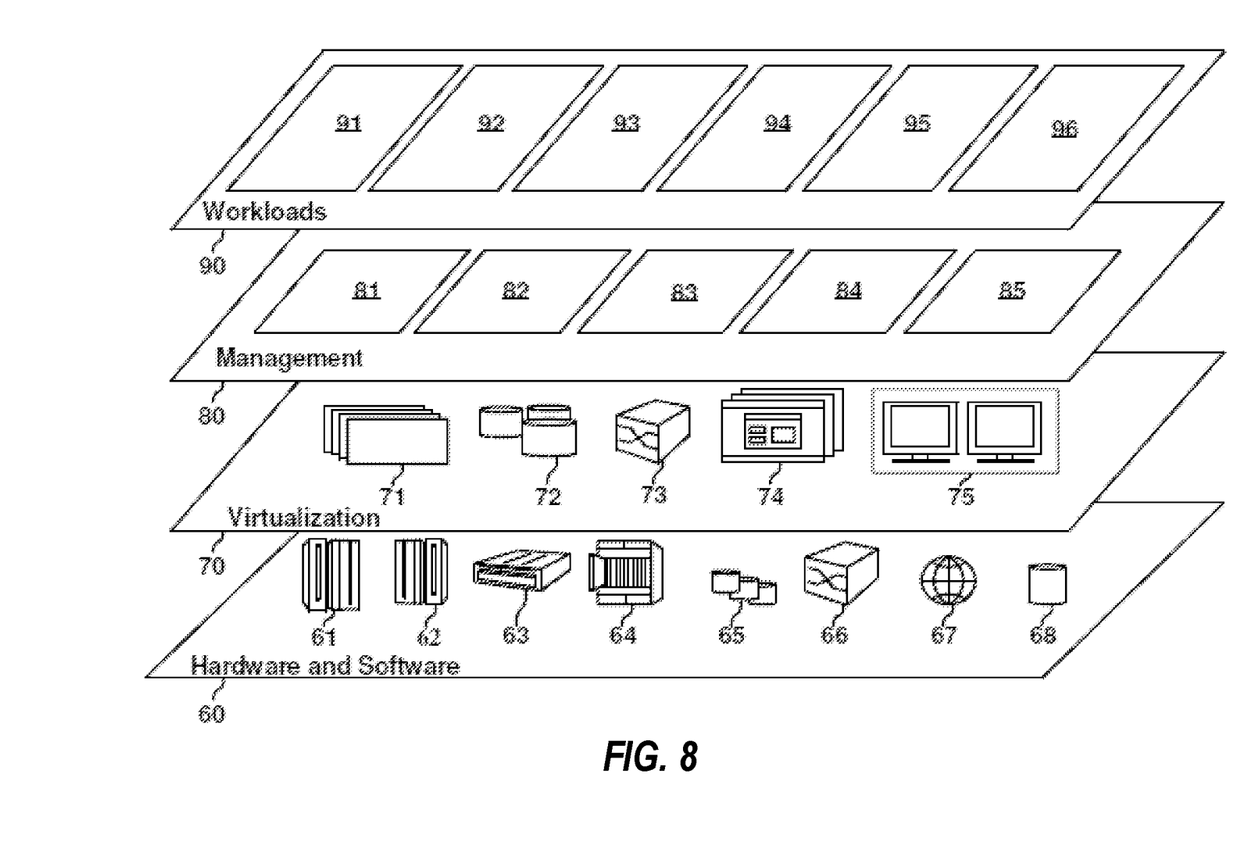
FIG. 8 depicts abstraction model layers according to one or more embodiments described herein.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly detection 96.

Figure 9:
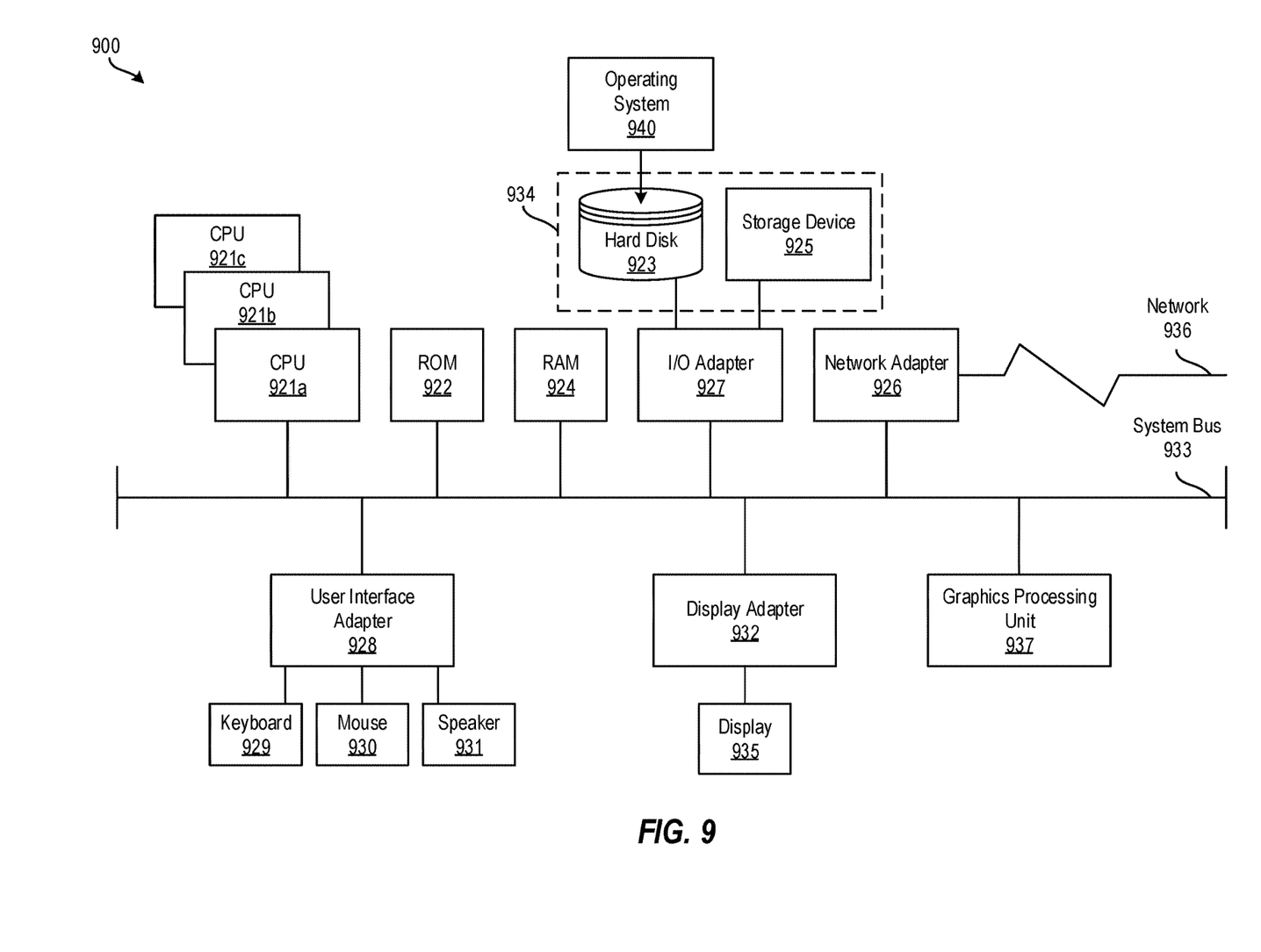
FIG. 9 depicts a block diagram of a processing system for implementing the presently described techniques according to one or more embodiments described herein.

It is understood that one or more embodiments described herein is capable of being implemented in conjunction with any other type of computing environment now known or later developed. For example, FIG. 9 depicts a block diagram of a processing system 900 for implementing the techniques described herein. In accordance with one or more embodiments described herein, the processing system 900 is an example of a cloud computing node 10 of FIG. 7. In examples, processing system 900 has one or more central processing units ("processors" or "processing resources") 921a, 921b, 921c, etc. (collectively or generically referred to as processor(s) 921 and/or as processing device(s)). In aspects of the present disclosure, each processor 921 can include a reduced instruction set computer (RISC) microprocessor. Processors 921 are coupled to system memory (e.g., random access memory (RAM) 924) and various other components via a system bus 933. Read only memory (ROM) 922 is coupled to system bus 933 and may include a basic input/output system (BIOS), which controls certain basic functions of processing system 900.

Further depicted are an input/output (I/O) adapter 927 and a network adapter 926 coupled to system bus 933. I/O adapter 927 may be a small computer system interface (SCSI) adapter that communicates with a hard disk 923 and/or a storage device 925 or any other similar component. I/O adapter 927, hard disk 923, and storage device 925 are collectively referred to herein as mass storage 934. Operating system 940 for execution on processing system 900 may be stored in mass storage 934. The network adapter 926 interconnects system bus 933 with an outside network 936 enabling processing system 900 to communicate with other such systems.

A display (e.g., a display monitor) 935 is connected to system bus 933 by display adapter 932, which may include a graphics adapter to improve the performance of graphics intensive applications and a video controller. In one aspect of the present disclosure, adapters 926, 927, and/or 932 may be connected to one or more I/O busses that are connected to system bus 933 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 933 via user interface adapter 928 and display adapter 932. A keyboard 929, mouse 930, and speaker 931 may be interconnected to system bus 933 via user interface adapter 928, which may include, for example, a Super I/O chip integrating multiple device adapters into a single integrated circuit.

In some aspects of the present disclosure, processing system 900 includes a graphics processing unit 937. Graphics processing unit 937 is a specialized electronic circuit designed to manipulate and alter memory to accelerate the creation of images in a frame buffer intended for output to a display. In general, graphics processing unit 937 is very efficient at manipulating computer graphics and image processing, and has a highly parallel structure that makes it more effective than general-purpose CPUs for algorithms where processing of large blocks of data is done in parallel.

Thus, as configured herein, processing system 900 includes processing capability in the form of processors 921, storage capability including system memory (e.g., RAM 924), and mass storage 934, input means such as keyboard 929 and mouse 930, and output capability including speaker 931 and display 935. In some aspects of the present disclosure, a portion of system memory (e.g., RAM 924) and mass storage 934 collectively store the operating system 940 such as the AIX® operating system from IBM Corporation to coordinate the functions of the various components shown in processing system 900.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a processing device, a list of objects with anomaly detection results associated therewith;
   generating, by the processing device, a resource graph, wherein the resource graph comprises at least two nodes, each of the at least two nodes being associated with one of the objects;
   determining, by the processing device, a type of a relationship between the at least two nodes, wherein the type of the relationship indicates a physical relationship between the resources represented by the at least two nodes and a summary method that is configured to generate a summary across multiple nodes having a same type of the relationship, wherein the summary method includes one of calculating an average value and identifying a maximum value;
   labeling an edge of the resource graph between the at least two nodes with the type of the relationship;
   assigning, by the processing device, an anomaly score to at least one of the objects; and
   calculating, by the processing device, for at least one of the nodes, an overall anomaly score for the at least one of the nodes based on the anomaly score for the at least one of the objects and based on the anomaly score for another node related to the at least one of the nodes,
   wherein the overall anomaly score for the at least one of the nodes is calculated using a weighted linear combination that combines the anomaly score from each of the at least two nodes multiplied by a weight that is determined based on the type of a relationship to the respective nodes, wherein the weight assigned to each of the type of a relationship is set by a user.

2. The computer-implemented method of claim 1, further comprising:
   determining whether the overall anomaly score for the at least one of the nodes exceeds a threshold.

3. The computer-implemented method of claim 2, further comprising:
   responsive to determining that the overall anomaly score for the at least one of the nodes exceeds the threshold, causing, by the processing device, an action to be taken to remedy at least one anomaly associated with the overall anomaly score that exceeds the threshold.

4. The computer-implemented method of claim 1, wherein a user is presented with an interface to view the resource graph, wherein the interface enables the user to drill down on one or more portions of the resource graph to view details about the one or more of the at least two of the nodes.

5. A system comprising:
   a memory comprising computer readable instructions; and
   a processing device for executing the computer readable instructions, the computer readable instructions controlling the processing device to perform operations comprising:
   receiving a list of objects with anomaly detection results associated therewith;

generating a resource graph, wherein the resource graph comprises at least two nodes, each of the at least two nodes being associated with one of the objects;

determining a type of a relationship between the at least two nodes, wherein the type of the relationship indicates a physical relationship between the resources represented by the at least two nodes and a summary method that is configured to generate a summary across multiple nodes having a same type of the relationship, wherein the summary method includes one of calculating an average value and identifying a maximum value;

labeling an edge of the resource graph between the at least two nodes with the type of the relationship;

assigning an anomaly score to at least one of the objects; and calculating for at least one of the nodes, an overall anomaly score for the at least one of the nodes based on the anomaly score for the at least one of the objects and based on the anomaly score for another node related to the at least one of the nodes, wherein the overall anomaly score for the at least one of the nodes is calculated using a weighted linear combination that combines the anomaly score from each of the at least two nodes multiplied by a weight that is determined based on the type of a relationship to the respective nodes, wherein the weight assigned to each of the type of a relationship is set by a user.

6. The system of claim 5, wherein the operations further comprise:
determining whether the overall anomaly score for the at least one of the nodes exceeds a threshold.

7. The system of claim 6, wherein the operations further comprise:
responsive to determining that the overall anomaly score for the at least one of the nodes exceeds the threshold, causing, by the processing device, an action to be taken to remedy at least one anomaly associated with the overall anomaly score that exceeds the threshold.

8. The system of claim 5, wherein a user is presented with an interface to view the resource graph, wherein the interface enables the user to drill down on one or more portions of the resource graph to view details about the one or more of the at least two of the nodes.

9. A computer program product comprising a computer readable storage medium having program instructions embodied therewith, the program instructions executable by a processor to cause the processor to perform operations comprising:

receiving a list of objects with anomaly detection results associated therewith;

generating a resource graph, wherein the resource graph comprises at least two nodes, each of the at least two nodes being associated with one of the objects;

determining a type of a relationship between the at least two nodes, wherein the type of the relationship indicates a physical relationship between the resources represented by the at least two nodes and a summary method that is configured to generate a summary across multiple nodes having a same type of the relationship, wherein the summary method includes one of calculating an average value and identifying a maximum value;

labeling an edge of the resource graph between the at least two nodes with the type of the relationship;

assigning an anomaly score to at least one of the objects; and calculating for at least one of the nodes, an overall anomaly score for the at least one of the nodes based on the anomaly score for the at least one of the objects and based on the anomaly score for another node related to the at least one of the nodes, wherein the overall anomaly score for the at least one of the nodes is calculated using a weighted linear combination that combines the anomaly score from each of the at least two nodes multiplied by a weight that is determined based on the type of a relationship to the respective nodes, wherein the weight assigned to each of the type of a relationship is set by a user.

10. The computer program product of claim 9, wherein the operations further comprise:
determining whether the overall anomaly score for the at least one of the nodes exceeds a threshold.

11. The computer program product of claim 10, wherein the operations further comprise:
responsive to determining that the overall anomaly score for the at least one of the nodes exceeds the threshold, causing, by the processing device, an action to be taken to remedy at least one anomaly associated with the overall anomaly score that exceeds the threshold.

* * * * *